Dec. 25, 1951  J. W. CHAMBERLIN ET AL  2,579,472
VIBRATION DAMPENING SUPPORT FOR CLEANING
AND EXTRACTING APPARATUS
Filed July 30, 1945  9 Sheets-Sheet 1

INVENTORS
JOHN W. CHAMBERLIN
JOHN F. HORVATH
BY

Fig. 2

INVENTORS
JOHN W. CHAMBERLIN
JOHN F. HORVATH

Dec. 25, 1951  J. W. CHAMBERLIN ET AL  2,579,472
VIBRATION DAMPENING SUPPORT FOR CLEANING
AND EXTRACTING APPARATUS
Filed July 30, 1945  9 Sheets-Sheet 3

INVENTORS
JOHN W. CHAMBERLIN
JOHN F. HORVATH
BY
their Attys.

Dec. 25, 1951  J. W. CHAMBERLIN ET AL  2,579,472
VIBRATION DAMPENING SUPPORT FOR CLEANING
AND EXTRACTING APPARATUS
Filed July 30, 1945 9 Sheets-Sheet 4

INVENTORS
JOHN W. CHAMBERLIN
JOHN F. HORVATH

Dec. 25, 1951     J. W. CHAMBERLIN ET AL     2,579,472
VIBRATION DAMPENING SUPPORT FOR CLEANING
AND EXTRACTING APPARATUS Filed July 30, 1945     9 Sheets-Sheet 5

INVENTORS
JOHN W. CHAMBERLIN
JOHN F. HORVATH
BY
Christon, Wiles, Schroeder, Merriam & Hofgren
their Attys.

Dec. 25, 1951    J. W. CHAMBERLIN ET AL    2,579,472
VIBRATION DAMPENING SUPPORT FOR CLEANING
AND EXTRACTING APPARATUS
Filed July 30, 1945    9 Sheets-Sheet 6

INVENTORS
JOHN W. CHAMBERLIN
JOHN F. HORVATH
BY
Chritton, Wiles, Schroeder, Merriam & Hofgren
their Attys Dec. 25, 1951     J. W. CHAMBERLIN ET AL     2,579,472
VIBRATION DAMPENING SUPPORT FOR CLEANING
AND EXTRACTING APPARATUS Filed July 30, 1945                                        9 Sheets-Sheet 9

INVENTORS
JOHN W. CHAMBERLIN
JOHN F. HORVATH
BY
their Attys.

Patented Dec. 25, 1951

2,579,472

UNITED STATES PATENT OFFICE 2,579,472

VIBRATION DAMPENING SUPPORT FOR CLEANING AND EXTRACTING APPARATUS

John W. Chamberlin, Mequon, and John F. Horvath, Milwaukee, Wis., assignors, by mesne assignments, to said John W. Chamberlin, Evanston, Ill.

Application July 30, 1945, Serial No. 607,740

7 Claims. (Cl. 68—24)

This invention relates to apparatus for washing or cleaning clothes, textiles and other materials and thereafter extracting the detergent from the material by centrifugal force.

The advantages of the horizontal axis, cylinder washer are well known in the laundry and dry cleaning industries. Many attempts have been made in the past to provide such structure with means for supporting and rotating the cylinder (after the washing or cleaning operation) at a speed sufficiently high to accomplish centrifugal extraction of the detergent. Such attempts have met with the problem of destructive vibration caused by out of balance loads in the cylinder during the high speed rotation of the cylinder.

Combination horizontal axis washing and centrifuging apparatus now on the market requires massive, rigid construction and heavy anchoring to firm foundations, usually of concrete. Even with such expensive and inflexible structures, the vibrations in such apparatus are so severe as to shake the buildings in which the apparatus is installed. However, the advantages of being able to combine a horizontal axis washer with a centrifugal extractor in such a manner as to permit the sequential treatment of textiles without manual transfer from machine to machine are so great that such apparatus has been commercially successful in spite of the disadvantages cited. The time and labor saved are great.

Another advantage of such horizontal axis combination machines is the fact that the slow speed washing or cleaning operation of a preferred type whereby the clothes are tumbled can be directly followed by a high speed centrifugal extracting operation, thus reducing greatly the rinse water required in the case of laundering and reducing the solvent losses in dry cleaning. It is obvious that the value of this latter advantage is dependent wholly upon the speed at which the centrifugal action can be accomplished. The aforementioned vibration has to this day limited horizontal centrifugal devices in this industry to speeds much lower than vertical axis machines having means for achieving dynamic balance during operation.

The primary object of the present invention is therefore to provide a new and improved apparatus capable of operation through a washing or cleaning operation and subsequently through a centrifugal extraction operation during which a condition of dynamic balance is achieved thus permitting high speeds without having excessive vibration transmitted to the supporting structure.

A further object of this invention is to provide a horizontal axis cylinder type combination washing and extracting apparatus capable of being operated sequentially at a low speed for accomplishing the detergent action and immediately thereafter at high speed for centrifuging without the necessity for intermediate operations or mechanism for accomplishing so called distribution of the material about the inside of the cylinder.

Another object of this invention is the elimination of the requirement for anchoring devices, concrete foundations and like structure as a necessary adjunct to the operation of horizontal axis machines having extraction means by providing in such a machine new and improved means for supporting and driving the cylinder thereof.

It is another object to provide new and improved means for supporting the cylinder of horizontal extractors that can be almost universally applied to any type of horizontal axis centrifuge, including those having loading doors in the end of the cylinder, those having loading doors in the periphery of the cylinder, those of a commercial laundering or dry cleaning character and those suitable for household or domestic use, whether manually or automatically controlled.

Other objects and advantages of the invention will be apparent from the following more detailed description and by reference to the accompanying drawings forming a part hereof and wherein.

While we have illustrated in the drawings and shall herein describe in detail a preferred form of the invention, together with modifications thereof, it is to be understood that these disclosures are to be considered as an exemplification of the principles of the invention and are not intended to limit the invention to the particular forms shown. The scope of the invention will be pointed out in the appended claims.

As illustrated in Figs. 1 to 14 and 21, the invention is embodied in a combination cleaning and extracting apparatus having generally a base frame 25 (Fig. 1) and a housing or casing 26 thereon. A cylindrical liquid tight container or shell 27 is supported on the frame 25 with its axis extending horizontally to provide a tub and within this shell is located a perforated cylinder 28, which is provided with an access door (not shown) in its curved surface in a manner well known in the art. This cylinder has solid end plates 29 and 30 (Fig. 2) to which journals 31 and 32 are securely fastened, the journals being normally aligned with the axis of the shell 27. These journals pass through sealing devices 33 and 34 respectively, which are secured to the inner edges of flexible corrugated diaphragms 35 and 36, which in turn have their outer edges secured to annular end plates 37 and 38 on the shell 27.

During a cleaning operation, the cylinder 28 is arranged to be rotated or oscillated at a relatively low speed with textiles or other materials to be cleaned located therein and a quantity of cleaning liquid in the shell 27. To assist in such cleaning operation, the cylinder may be provided with a plurality of ribs 39, four of which are illustrated in the forms of the invention herein disclosed. To support the cylinder rotatably within the shell for such cleaning operation and more particularly to support the cylinder as well during a subsequent high speed extracting or centrifuging operation, the invention provides novel mechanism about to be described.

Referring principally to Figs. 2 to 7, the journals 31 and 32 each extend through and are rotatably supported in three concentric and adjacent ball bearings 46. Two of each set of these are supported in bifurcated members 40 and 41 and the other is supported in end members 42 and 43 carried on horizontally extending arms 44 and 45. The journal 31 extends through the ball bearings 46 to receive a drive pulley 47, whereas the journal 32 extends through the ball bearings and carries on its outer end a brake device 48 (hereinafter more fully described).

The bifurcated members 40 and 41 are carried on arms 49 and 50, respectively, which extend away from the journals in a generally horizontal direction opposite to that of the arms 44 and 45. At their outer ends, the arms 44 and 45 are connected by means of a hollow cross member or tube 51. As illustrated most clearly in Fig. 14, the end of the tube 51 extends through bifurcated end members 52 and 53 on the arms 44 and 45 and also through end members 54 and 55 on downwardly extending arms 56 and 57. These arms at their lower ends are pivoted to blocks 58.

The arms 49 and 50 at the rear of the cylinder 28 are similarly provided with bifurcated end members 60 and 61 and a tube 62 extends through said end members and end members 64 and 65 on another pair of downwardly extending arms 66 and 67, the lower ends of which are pivotally supported on blocks 58.

Figure 3:
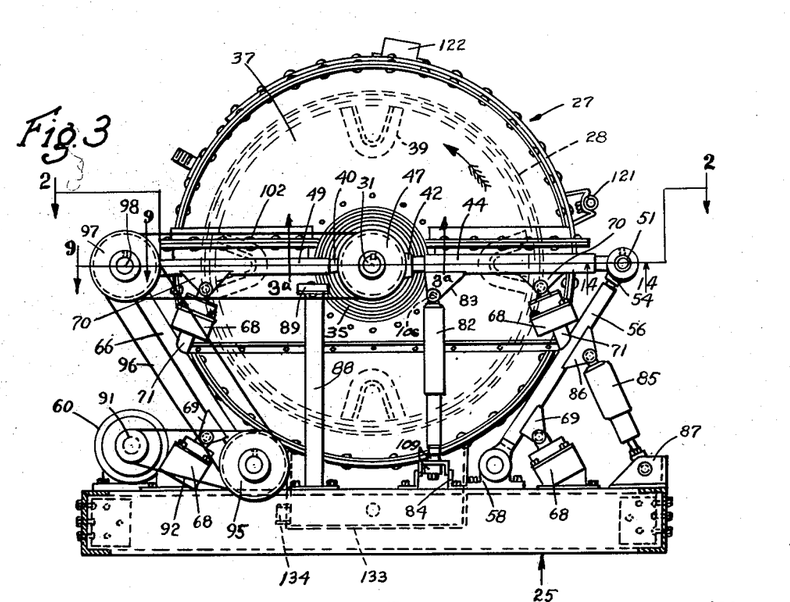
Fig. 3 is a vertical section on a reduced scale along the line 3—3 of Fig. 2.
Figures 4, 4A:
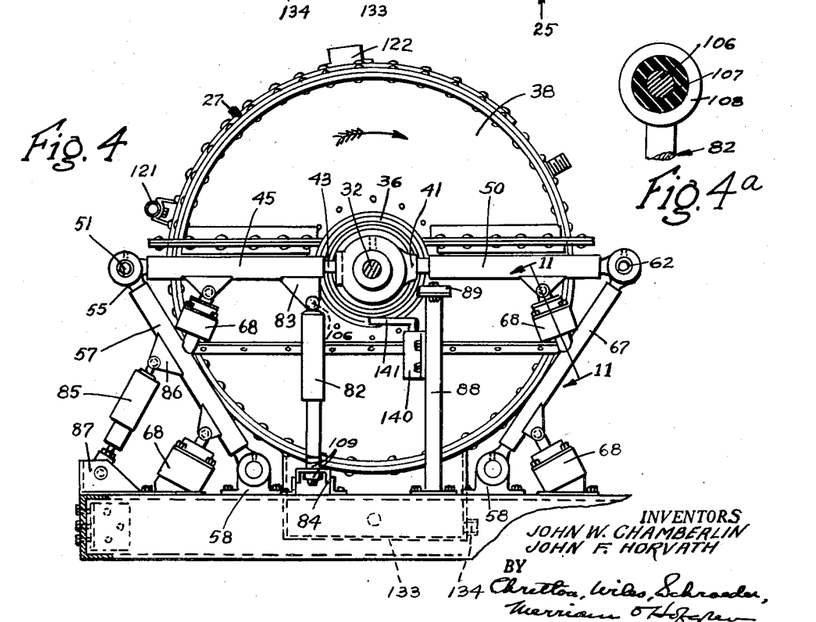
Fig. 4 is a vertical section along the line 4—4 of Fig. 2, drawn to the same scale as Fig. 3.
Fig. 4a is a fragmentary detail section.
Figures 9, 10, 11:
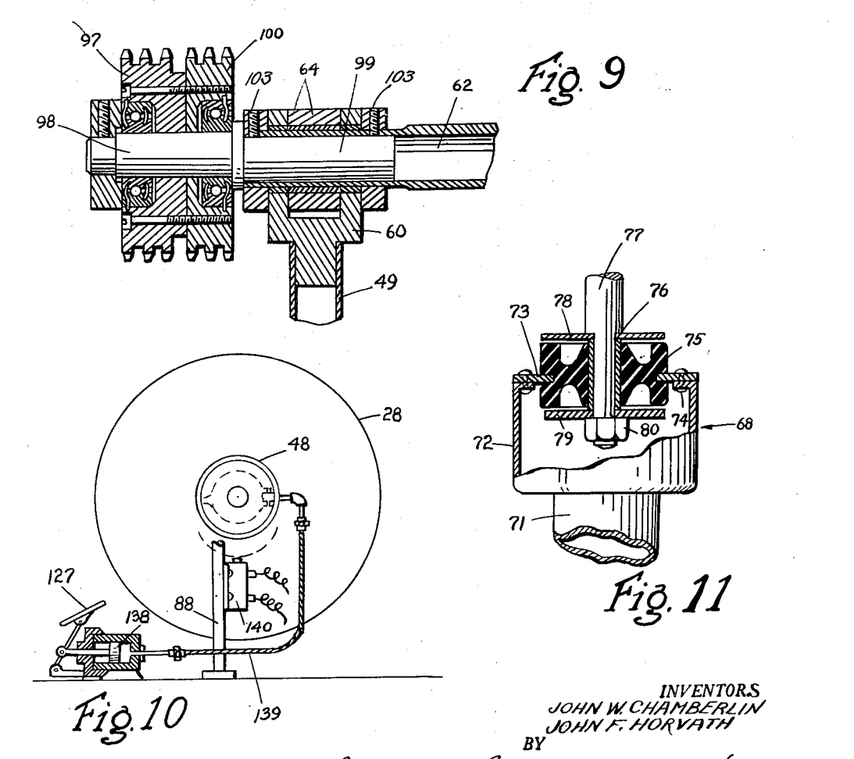
Fig. 9 is an enlarged fragmentary section along the line 9—9 of Fig. 3 with the parts in one adjusted position.
Fig. 10 is a diagrammatic view illustrating a braking mechanism.
Fig. 11 is an enlarged fragmentary section along the line 11—11 of Fig. 4.

Normally the cylinder 28 and any load therein is supported in a position concentric with the shell 27 by the arms just described, aided by a plurality of resilient connecting devices 68 of the type shown in section in Fig. 11. As shown in Fig. 3, such connecting devices 68 are secured between the frame 25 and brackets 69 on the arms 56 and 66 and additional devices 68 are secured between brackets 70 on the arms 44 and 49 and tubular brackets 71 on the arms 56 and 66. Similarly at the other end of the shell, as illustrated in Fig. 4, additional devices 68 are connected between the frame 25 and the arms 57 and 67 and between said arms and the arms 45 and 50.

The resilient connecting devices 68, as shown in Fig. 11, consist of a cup-shaped member 72 secured to a bracket 71, an apertured plate 73 riveted to an in-turned flange 74 on the member 72, an annular rubber or other resilient member 75 having a peripheral groove into which the apertured plate 73 is fitted (and preferably bonded), a bushing 76 bonded to a central bore in the member 75 and a rod 77 to which the bushing 76 is rigidly secured by means of spaced washers 78 and 79 and a nut device 80. Preferably the washers 78 and 79 are spaced from the ends of the resilient member 75, as shown in Fig. 11, so as to produce a readily flexible connecting device of limited range.

Referring again to Figs. 3 and 4, it will be apparent that the devices 68 intermediate the frame 25 and the arms 56, 57, 66 and 67 serve to determine the normal upwardly inclined positions of said arms and to support the arms in such positions. The upper devices 68 intermediate said arms and the horizontal arms 44, 45, 49 and 50, respectively, determine the positions of the horizontal arms with respect to the upright arms and to support the horizontal arms in their substantially horizontal positions. In addition, the devices 68 cooperate with all of the arms to carry the weight of the loaded cylinder 28.

The cylinder supporting mechanism just described enables the loaded cylinder to rotate at high speed about its center of gravity without transmitting vibration back to the frame 25.

Figure 12:
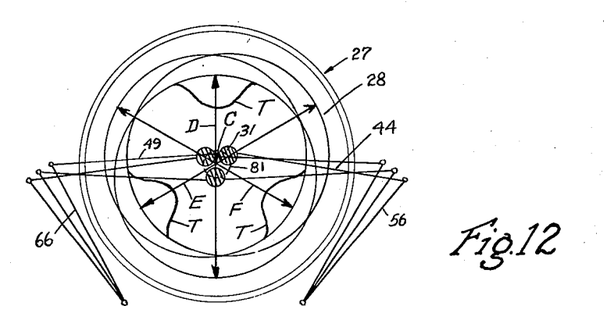
Fig. 12 is a diagrammatic view of the movement of the cylinder during high speed operation about the center of gravity of the loaded cylinder.

The horizontal arms 44, 45, 49 and 50 pivot at their outer ends and thereby permit the cylinder journals to oscillate in a vertical direction. The pivotal connections between the upright arms and the brackets 58 enable the horizontal arms and the cylinder to oscillate in a horizontal direction. In operation at high speed, the cylinder is thus permitted to rotate about its center of gravity with the journals moving in an orbit 81 as indicated in Fig. 12 when the load in the cylinder is unbalanced.

Figures 1, 4B:
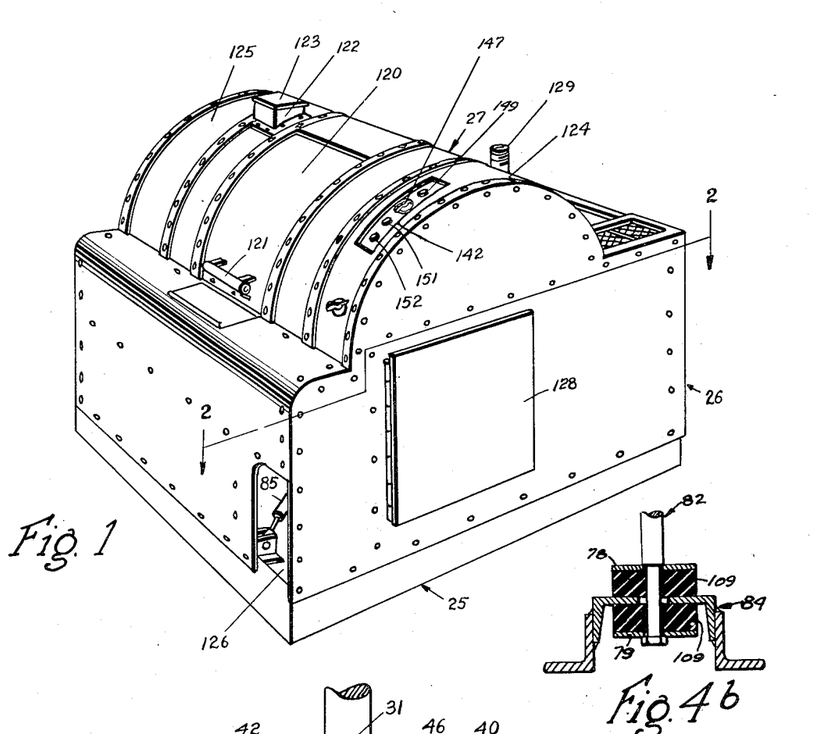
Fig. 1 is a perspective view of a preferred form of the invention.
Fig. 4b is a fragmentary detail section.

In addition to the resilient connecting devices 68 which determine the normal positions of the parts as hereinbefore described, the invention preferably provides two-way acting dashpot devices or snubbers 82, pivotally connected between brackets 83 on the arms 44 and 45 and brackets 84 on the frame 25. Preferably a rubber bushing 107 (as shown in Fig. 4a) is provided between each snubber and the corresponding bracket 83 and rubber bushings 109 are provided between the lower ends of the snubbers and brackets 84, as illustrated in Fig. 4b. Additional dashpots or snubbers 85 are connected between brackets 86 on the arms 56 and 57 and brackets 87 on the frame 25, also in the manner shown in Fig. 4a. The devices 82 and 85 are preferably provided to yieldably resist excessive oscillatory movements of the arms and although they may be of any preferred construction, devices of the type disclosed in U. S. Letters Patent No. 2,214,038 of September 10, 1940, to Eugene L. Beecher have been found to operate successfully.

As illustrated herein, a pair of bumper posts 88 are secured to the frame 25 and extend upwardly to a position under the arms 49 and 50 adjacent the end members 40 and 41 and carry rubber or other resilient pads 89 to support the horizontal arms and the loaded shell in the event of failure of part of the supporting means for the shell.

As illustrated in the drawings, the cylinder 28 is arranged to be driven by means of a prime mover, as, for example, an electric motor 90, which is stationarily mounted on the frame 25 and a drive is provided between the motor and the pulley 47 on the cylinder journal 31 for driving the cylinder at relatively low speed for cleaning purposes and at high speed for extracting purposes. This drive includes a speed change mechanism 190 and is arranged to operate efficiently at both speeds and is particularly adapted to operate efficiently at high speed during orbital movement of the cylinder due to an unbalanced load therein.

Figure 2:
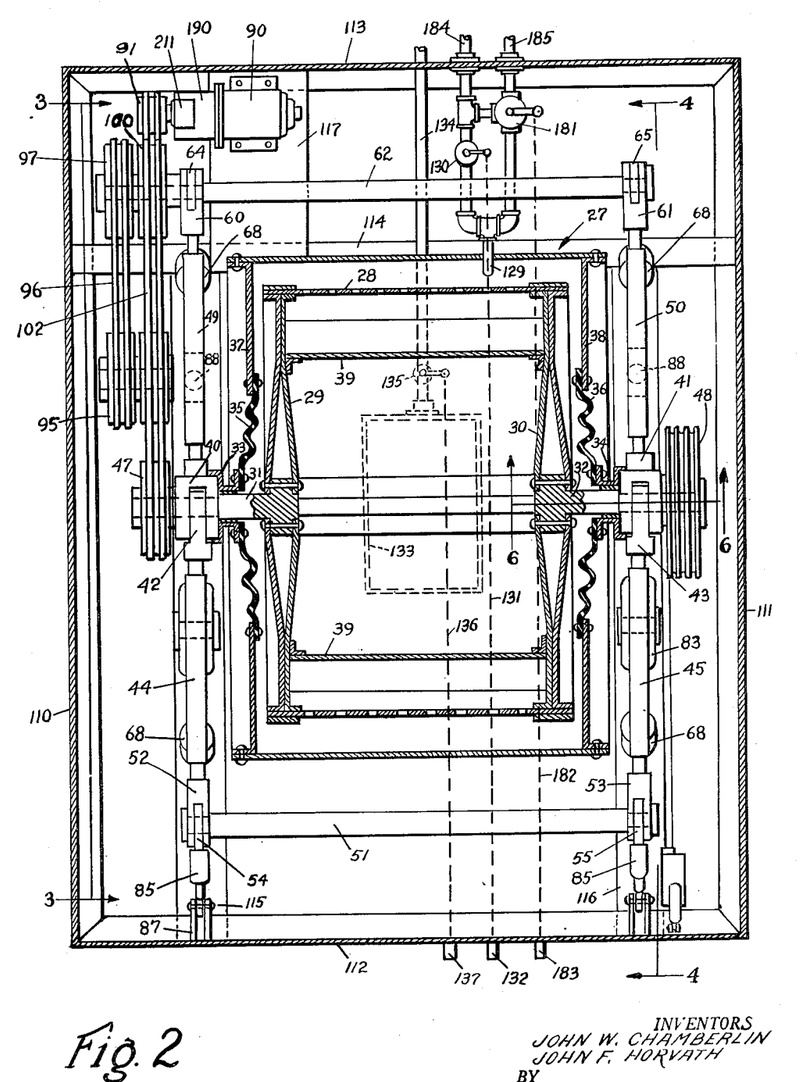
Fig. 2 is a plan section approximately along the lines 2—2 of Figs. 1 and 3.
Figures 5, 6, 7:
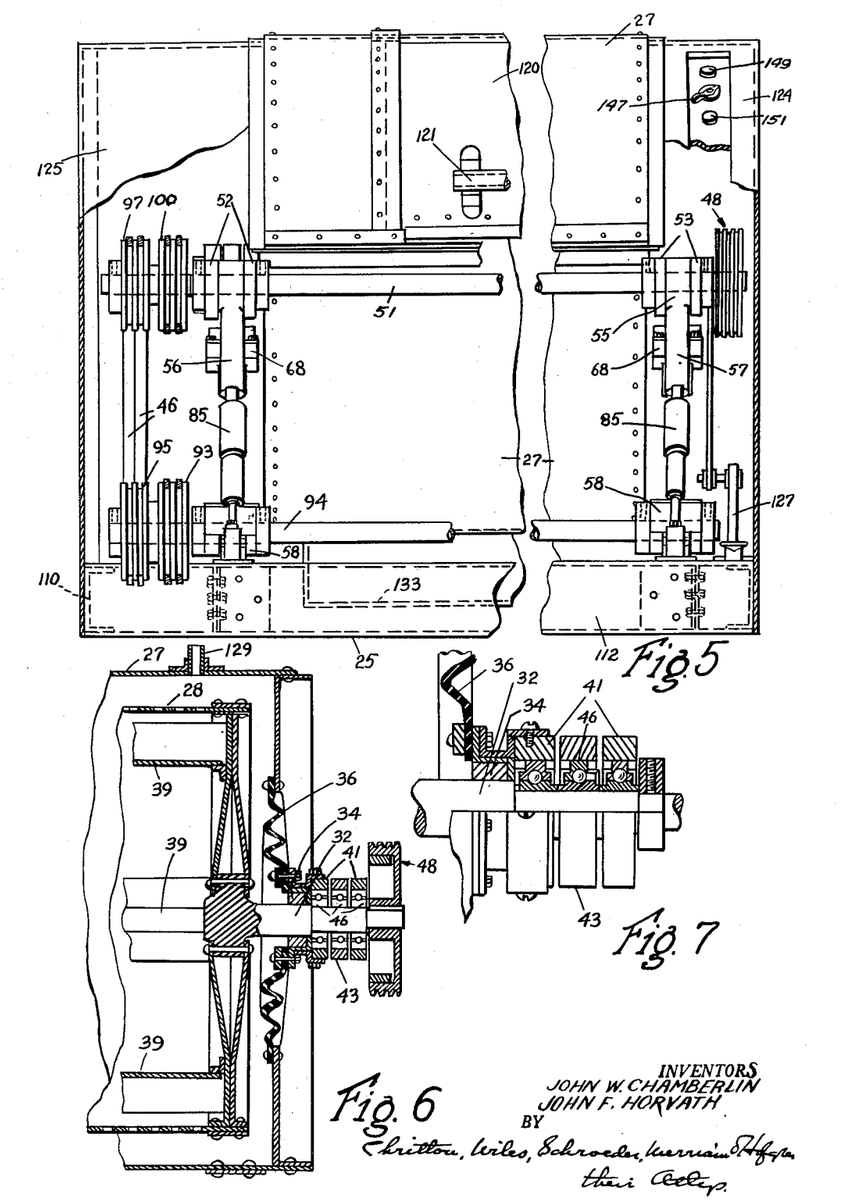
Fig. 5 is a fragmentary front elevation to the same scale as Fig. 2, with portions of the housing broken away.
Fig. 6 is a fragmentary vertical section along the line 6—6 of Fig. 2.
Fig. 7 is an enlarged fragmentary portion of Fig. 6.
Figure 8:
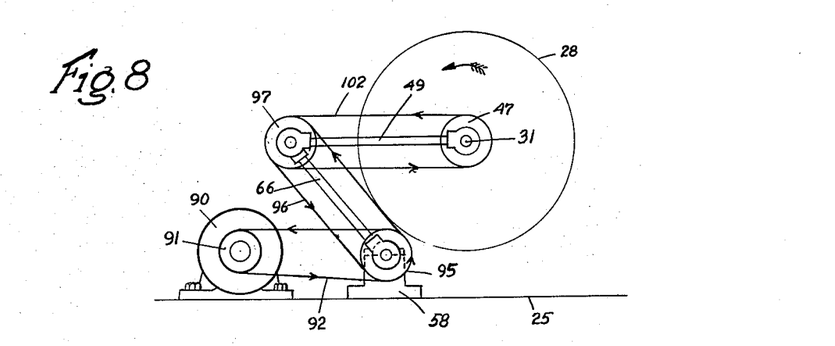
Fig. 8 is a diagrammatic illustration of the drive mechanism when viewed in the same direction as in Fig. 3.
Figure 13:
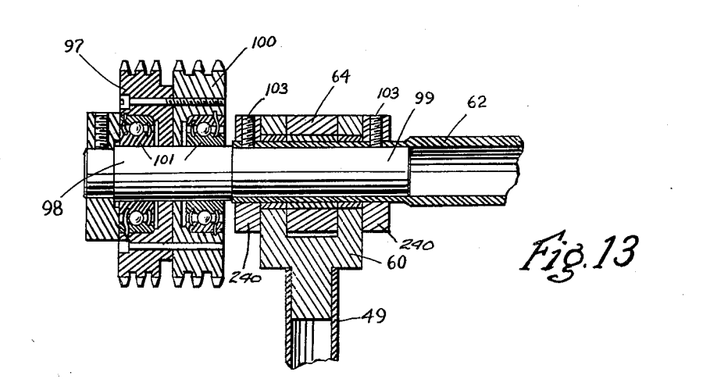
Fig. 13 is an enlarged fragmentary section similar to Fig. 9, but with the parts in a different adjusted position.

As best illustrated in Figs. 2, 3 and 5, a pulley 91 on the output shaft of speed change mechanism 190 is connected by means of a belt 92 to a pulley 93, supported on a shaft 94 which extends horizontally through the brackets 58 to which the lower ends of the arms 66 and 67 are connected. A second pulley 95 is formed integrally with the pulley 93 and is connected by means of V-belts 96 to a pulley 97 rotatably supported on an eccentric portion 98 of a short shaft 99 secured in the adjacent end of the hollow cross shaft 62 (Figs. 9 and 13). Pulley 97 is bolted to an adjacent pulley 100, the pulleys being supported on the eccentric portion 98 by ball bearing 101, and a pair of V-belts 102 connect the pulley 100 to the pulley 47 fixed on the cylinder journal 31. Since the distance between the centers of pulleys 93 and 97 and the distance between the centers of pulleys 100 and 47 are always fixed and constant as determined by the lengths of the arm 66 and arm 49, the belts between said pulleys are at all times maintained in efficient driving relation thereto regardless of inbalance or out-of-balance operation of the cylinder 28.

To facilitate adjusting the tension of the belts 96 and 102, the short shaft 99, as shown in Figs. 9 and 13, may be adjusted angularly about its axis in the cross shaft 62 by loosening set screws 103 (which are carried in the end member 60 of the arm 49), these screws being again tightened after adjustment has been made. As will be apparent by comparing Figs. 9 and 13, it is evident that by swinging the eccentric portion 98 about the axis of the shaft 99, the distance between the centers of the pulleys 93 and 97 and also the distance between the centers of the pulleys 100 and 47 may be adjusted.

In the form illustrated in Figs. 1 to 14, the base frame 25 is fabricated from channels and other structural sections and comprises generally (Figs. 1 to 5) side channels 110 and 111, a front channel 112 and a rear channel 113, an intermediate cross channel 114 and a pair of parallel channels 115 and 116 extending between the front channel 112 and the channel 114. All of these parts are suitably riveted, welded or otherwise secured together to provide a rigid frame which is capable of supporting and anchoring the apparatus without being bolted or otherwise secured to a floor. The motor 90 is supported on a plate 117 fastened to the channels 113 and 114.

The casing 26 is detachably secured to the frame and is formed in part by the upper half of the shell 27. This shell is provided with an access opening having a slidably mounted door 120 provided with a handle 121, and has also an inlet 122 for admitting soap or other material and which is provided with a lid 123. To improve the appearance of the apparatus, semi-circular end portions 124 and 125 are provided, extending the contour of the shell 27 out to the sides of the machine. An opening 126 is provided in the front wall of the casing to furnish access to a pedal 127 (Figs. 5 and 10) for operating the brake device 48 for the cylinder, and a door 128 is provided (preferably in each end of the machine) to furnish access to the interior. A control box 142 is recessed in end portion 124.

A pipe 129 is adapted to conduct cleaning liquid into the shell 27 and is connected to a hot water pipe 184 provided with a control valve 130 which is operable from the front of the machine by means of a rod (indicated by the dashed line 131, Fig. 2), the front end of which has a suitable handle 132. A cold water pipe 185 is also connected to pipe 129 and has a valve 181 therein which is operable by means of a rod (indicated by dashed line 182), the front end of which has a suitable handle 183. A sump 133 under the shell 27 is provided with an outlet pipe 134 in which a control valve 135 is located. This valve is operable by means of a rod indicated by the dashed line 136, the front end of which has a suitable handle 137.

It is contemplated that the cylinder 28 will be provided with a suitable door in the perforated portion thereof and which may readily be aligned with the access opening of the shell 27 when the door 120 thereon is open, to facilitate loading and unloading the cylinder. To enable an operator to stop the cylinder quickly, the brake device 48 is provided. Herein this device is illustrated as of the hydraulic type operable by the pedal 127 and a piston and cylinder device 138 which is connected to the brake device by a flexible conduit 139 (Fig. 10).

A limit switch 140 is mounted on one of the posts 88 and has an operating arm 141 arranged to be contacted and depressed by the end member 41 of the arm 50 in the event the cylinder is sufficiently unbalanced to have excessive movement. It is contemplated that this limit switch will be connected in circuit with the driving motor so that if it is operated, the motor is disconnected and the apparatus shut down.

Although it is readily possible to provide an automatic control for the machine, including a sequence timer and other means for changing the speed of the cylinder and operating the inlet and outlet valves in a manner well known in the art, the invention as disclosed in Figs. 1 to 14 and 21 is arranged for manual control at the will of the operator. Control box 142 (Figs. 1 and 21), which is mounted in a portion 124 of the casing 26, is equipped with a switch and a plurality of push button stations which are arranged to operate a magnetic switch device 143 (Fig. 21) for starting and stopping the motor 90 (herein illustrated as of the three-phase type). Current supply leads L1, L2 and L3 are connected to the upper side of the switch devices 144, which are arranged to be closed simultaneously by energization of a wound magnet 145. The lower contacts on the switch devices are connected by leads 146 to the motor 90.

Figure 21:
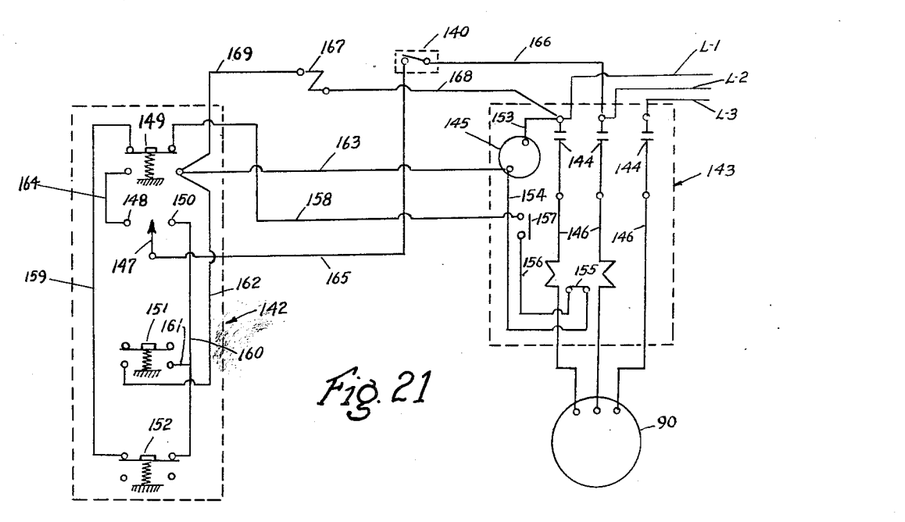
Fig. 21 is a wiring diagram for the machine illustrated in Figs. 1 to 14.

In the control box 142, a manually operable master switch 147 is provided. When this switch is moved towards the left to engage the contact 148, the cylinder of the machine may be "inched" under the control of push button 149. When the switch 147 is moved to the right to engage contact 150, the cylinder of the machine may be started by operation of the push button 151 and may thereafter be stopped under control of a "stop" push button 152 (or the button 149). When the switch 147 is disengaged from both contacts 148 and 150, the machine is inoperative.

One side of coil 145 is permanently connected to line L1 by a lead 153. The other side of the coil 145 is connected (in series) by a lead 154 to an overload relay 155, thence by lead 156, a holding circuit switch 157 and lead 158 to one of the upper contacts on push button 149. The other upper contact of the push button is connected by lead 159 to one of the upper contacts on push button 152, the other of which is connected by lead 160 to switch contact 150 and by short lead 161 to one of the lower contacts on push button 151. A lead 162 connects the other lower contact on push button 151 to one of the lower contacts on push button 149, which contact is in turn connected by a lead 163 to the coil 145. A lead 164 connects the switch contact 148 with the other lower contact of push button 149. The switch 147 is connected by a lead 165 to one side of the limit switch 140, the other side of which is connected by a lead 166 to line L2 to complete the control circuit. Preferably a magnetic brake 167 is provided on the motor 90 and is of the type which is disengaged when energized. This brake is connected to line L1 by a lead 168 and to lead 163 by a lead 169 so that the magnetic brake is released whenever the coil 145 is energized to operate the motor. The holding circuit switch 157 is also operated by the wound magnet 145 so as to close and open with the switch devices 144.

With the switch 147 engaging contact 148, the cylinder 28 may be "inched" to bring the opening therein into alignment with the access opening in the shell controlled by door 120. The inching is then accomplished by depressing push button 149 to bridge the lower contacts, whereupon the holding circuit normally passing through the upper contacts of said push button is broken and the magnet 145 is energized from L1 through lead 153 and from L2 through lead 166, limit switch 140, lead 165, switch 147, lead 164, push button 149 and lead 163. The motor 90 operates only so long as the push button 149 is depressed.

By swinging the switch 147 into engagement with the contact 150, the push button 151 is operative to start the motor 90. Then one side of the magnet 145 is connected to line L2 through lead 166, limit switch 140, lead 165, switch 147, lead 160, the lower contacts on push button 151, lead 162 and lead 163. With the closing of the magnetic switch, the holding circuit switch 157 also closes to complete a parallel circuit from the magnet 145 to the line L2 through lead 158, overload relay 155, lead 156, switch 157, lead 158, upper contacts on push button 149, lead 159, upper contacts of push button 152, and lead 160, and thence through switch 147, lead 165, limit switch 140, and lead 166. Thus, with the switch 147 engaging contact 150, the motor 90 continues in operation after momentary depression of push button 151. During such operation, the motor can be stopped at any time by depressing push button 149 or push button 152, both of which are then connected in a series in the holding circuit for the magnet 145.

The operation of the invention, as embodied in the apparatus of Figs. 1 to 14 and 21, is as follows:

After opening the door 120 in shell 27 and inching the cylinder 28 (by engaging switch 147 with contact 148 and depressing push button 149) until the opening in the cylinder is aligned with the opening in the shell, textiles (or other materials) may be placed in the cylinder and the doors closed. With the drain valve 135 closed, a detergent may be supplied to shell 27 through operation of valves 130 and 131 and soap or other suitable material may be inserted through inlet 122. The cylinder is then rotated at a relatively slow speed by motor 90 through transmission 190 by moving switch 147 to engage contact 150 and depressing the push button 151. Preferably the cylinder 28 rotates continuously in one direction at a low or washing speed, though if so desired, a transmission can be provided which will reverse the cylinder periodically if an oscillatory movement of the cylinder is desired. During the period of detergent treatment the cylinder rotates approximately coaxially within the shell with only occasional deviating movements caused by the tumbling of the load of textiles. These movements are permitted by the resilience of the supporting mechanism (40 to 46 and 49 to 79) for the cylinder and the flexible diaphragms 35 and 36.

After a period of time the detergent is drained from shell 27 through sump 133 and drain valve 135, and transmission 190 is adjusted to drive the cylinder at a high or extracting speed. As the cylinder is accelerated from the low speed to high speed, it passes through various critical speeds or vibrational harmonics in a well known manner. Excessive movement of the cylinder during this acceleration period is prevented by the snubbers 82 and 85. In order that the snubbers 82 (Figs. 3 and 4) permit limited movement of the supporting arms within the intended capacity of the resilient connecting devices 68, the ends of the snubbers are preferably connected to the horizontal arms and to the frame through resilient means herein illustrated more clearly in Figs. 4a and 4b. Fig. 4a is a section through a pivot pin 106 in each bracket 83 to which the upper ends of the snubbers are connected. A bushing of rubber or other resilient material 107 is internally bonded to said pin and externally bonded to the upper end 108 of the snubber 82. The lower end of each snubber 82 (Fig. 4b) is connected to a bracket 84 by a resilient connecting device somewhat similar in construction to the devices 68. It includes a pair of bushings of rubber or other resilient material 109 bonded to a sleeve positioned between washers 78 and 79 carried by the snubber. The bracket 84 has an apertured top member fitted in between the bushing 109. Preferably the snubbers 85 also have resilient connections similar to that shown in Fig. 4a with the brackets 86 and 87, so that all of the snubbers normally take effect only when the movements of the supporting arms exceed that which the resilient connecting devices 68 are designed to accommodate.

Operation normally continues at high speed until the operator depresses push button 152.

During high speed operation the cylinder 28 is free to rotate substantially about the center of gravity of the loaded cylinder, (as, for example, with its journals traveling in an orbit 81 as shown in Fig. 12) thus oscillating the horizontal and vertical supporting arms through the successive positions D, E and F and flexing the resilient connecting devices 68, as the cylinder rotates clockwise. In Fig. 12, T indicates an unbalanced load which shifts the center of gravity of the loaded cylinder from the journal 31 to the point C. During high speed operation, the cylinder rotates about an axis through the point C. The amount of vibration transmitted to the base, the shell or to the floor of the building in which the apparatus is located, is negligible. In case the out-of-balance load is greater than the safe amount of movement provided in the arms and resilient connecting devices, the limit switch 141 will be actuated by the end member 41 of horizontal support arm 50 under which it is located, thus cutting off the power or returning the machine to low speed operation. The cycle through which the machine is operated can be practically any one desired by the operator.

It can thus be seen from the description of the operation of the machine that anchor bolts, expensive installations and the like can be eliminated, while the many advantages of horizontal axis apparatus are retained. The necessity for removing the textiles from the washer to a separate extractor is eliminated, and the cycle is greatly reduced in time. Much labor is saved and the high speed extraction makes possible great savings in water, soap or dry cleaning solvent as the case may be. The cost of construction of the machine is substantially less than that required by previous bulky, weighty, rigid apparatus. Floor space required per unit of material treated is reduced substantially.

Figure 14:
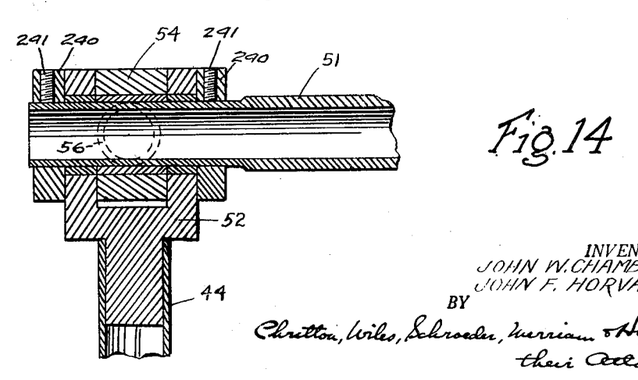
Fig. 14 is an enlarged fragmentary section along the line 14—14 of Fig. 3.
Figure 15:
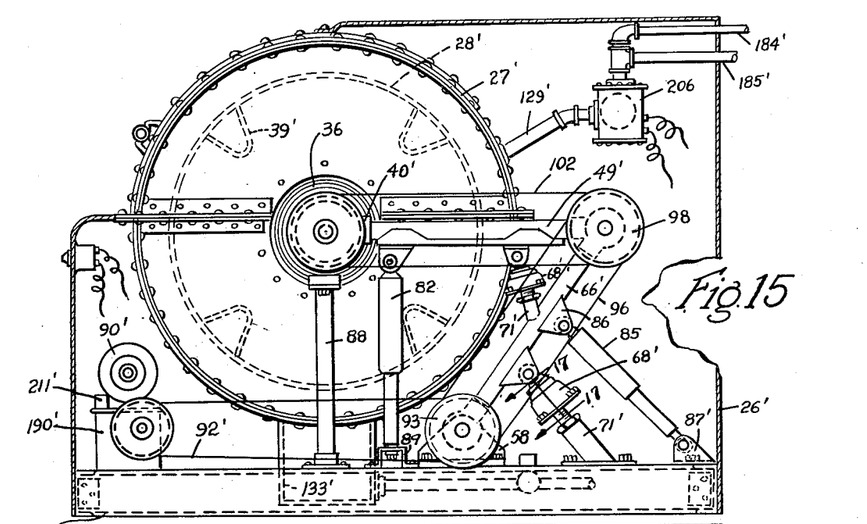
Fig. 15 is a vertical section of a modified form of the invention taken approximately along the line 15—15 of Fig. 16.
Figures 16, 17:
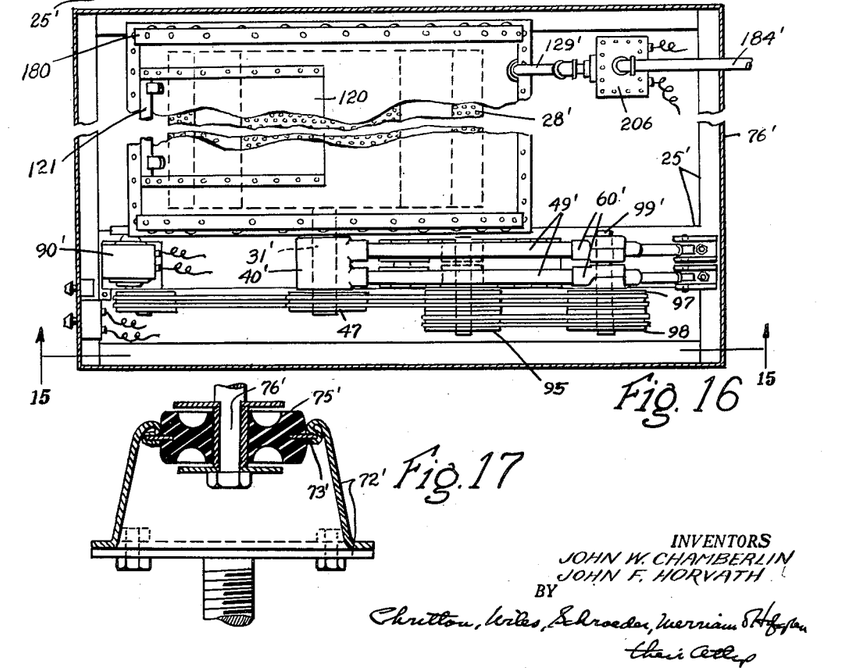
Fig. 16 is a fragmentary plan view thereof.
Fig. 17 is an enlarged fragmentary section along line 17—17 of Fig. 15.

In the form illustrated in Figs. 15 to 17, the invention is also embodied in a horizontal cylinder-type cleaning and extracting apparatus and differs essentially from the form of Figs. 1 to 14 in that the rotating cylinder 28' is supported entirely by a single journal 31' at one end thereof instead of the pair of journals 31 and 32 of the previous form. In Figs. 15 to 17, parts which are identical with those in Figs. 1 to 14 bear the same numeral, whereas, those which are analogous but of different detailed construction bear corresponding numerals with a prime added.

Cylinder 28' is located within a shell 27', one end 180 of which is closed and the other end of which includes a flexible corrugated diaphragm 36 through which the journal 31' extends. The journal is supported in a pair of bearings (like 46 of Figs. 6 and 7) positioned in laterally spaced relation in an end member 40' on a horizontal support arm 49' which is comprised of a pair of parallel tubes and has an end member 60' at the other end thereof. End member 60' is pivotally connected to the upper end of a pair of downwardly extending and parallel arms 66' by means of a sleeve bearing on a stub shaft 99', which is similar to shaft 99 of Fig. 9, and carries pulleys 97 and 98. Horizontal support arm 49' is supported from the arm 66' by means of a resilient connecting device 68'. As illustrated in Fig. 17, this connecting device differs from the one of Fig. 11 essentially in having a two-part cup 72' and a crimped portion supporting an apertured plate 73'. A similar resilient connecting device 68' is placed between the arm 66' and the frame 25' of the machine.

As shown, the cylinder 28' is arranged to be driven through pulleys and belts in the same manner as the cylinder of Figs. 1 to 14, from a motor 90'. As illustrated in Figs. 15 and 16, the motor is supported on a speed change mechanism 190' and is adapted to operate the cylinder at low speed for washing or cleaning purposes and at a high speed for extracting purposes. By supporting the cylinder entirely from one end thereof, the opposite end is left free and clear and if desired, the cylinder and also the shell 27' may be fitted with aligned transparent windows (not shown) to permit viewing operations within. Furthermore, an access door could be provided in the free end of the cylinder and the door to the shell could similarly be placed in the end 180 thereof if an end-opening machine is desired instead of one with the door 120 located on top of the shell.

Figure 22:
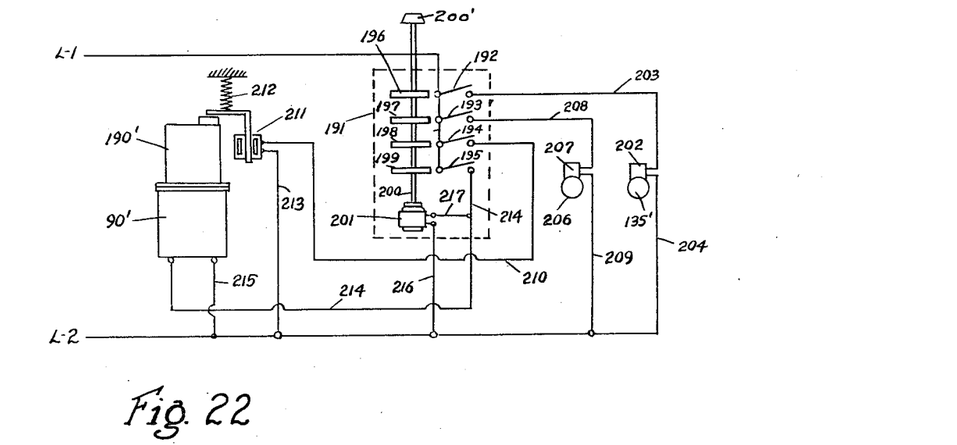
Fig. 22 is a wiring diagram for the modifications of Figs. 15 to 20.

An automatic control system is provided for the machine of Figs. 15 and 16 and is illustrated diagrammatically in Fig. 22. This control includes a multiple circuit time control switch 191 having four switch arms, 192, 193, 194 and 195, arranged to be closed and opened in predetermined sequence by cams 196, 197, 198 and 199 carried on a shaft 200 of a synchronous timing motor 201. The shaft 200 may have a speed of about one revolution in one-half an hour. In this form of the invention, the sump valve 135' is solenoid operated and has an operating solenoid 202, one side of which is connected by a lead 203 to the contact of switch arm 192 and the other side of which is connected by lead 204 to one side L2 of a current supply source. The other side L1 of the current supply source is connected to each of the switch arms by means of a lead 205.

A single valve 206 is provided to control the supply of liquid to the shell 27', this valve being located in the pipe 129' so as to receive liquid from the hot and cold water pipes 184 and 185, the manual valves wherein are generally preset so as to furnish water at a predetermined temperature to the pipe 129'. Valve 206 has an operating solenoid 207, one side of which is connected by a lead 208 to the contact of switch arm 193, while the other side is connected by lead 209 to line L2. The contact of switch arm 194 is connected by a lead 210 to one side of a solenoid device 211, which when energized shifts the speed change mechanism 190' to drive the cylinder of the machine at a low or washing speed, and which when de-energized permits a spring 212 to shift the speed change mechanism to drive the cylinder at a high or extracting speed. The other side of solenoid 211 is connected by a lead 213 to line L2. The contact for the switch arm 195 is connected by a lead 214 to one terminal of the motor 90', the other terminal of which is connected by lead 215 to line L2. Timing motor 201 is connected by a lead 216 to line L2 and by a lead 217 to lead 214.

Thus, when the machine is placed in operation and lines L1 and L2 are energized, the timing motor shaft 206 is rotated, preferably manually as by means of a member 200', until switch arms 193, 194 and 195 are closed and causes energization of motors 90 and 200, and the opening of valve 206. Sump control valve 135' is normally closed so liquid can enter the shell 27' for a predetermined length of time, filling it to the desired level, generally below the axis thereof. Closing of switch arm 194 shifted the speed change mechanism to low speed drive. After the cylinder has been driven at a low speed for the desired length of time, cam 196 operates switch arm 192 so as to energize solenoid 202 and permit the sump drain valve 135' to open. As soon as the liquid has receded sufficiently, cam 198 releases the switch arm 194 and permits spring 212 to shift the speed change mechanism to high speed drive. After the desired interval of high speed drive, switch arm 195 is opened to shut down the motor 90' and also the timing motor 201.

Figure 18:
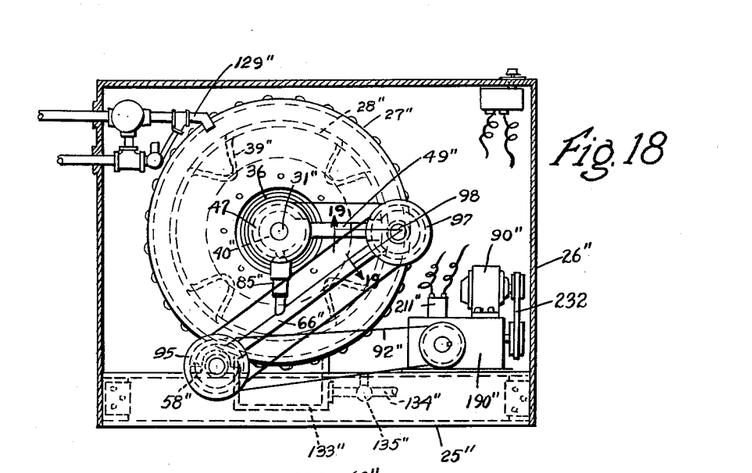
Fig. 18 is a vertical section through a third form of the invention, looking at one end of a cylinder.
Figure 19:
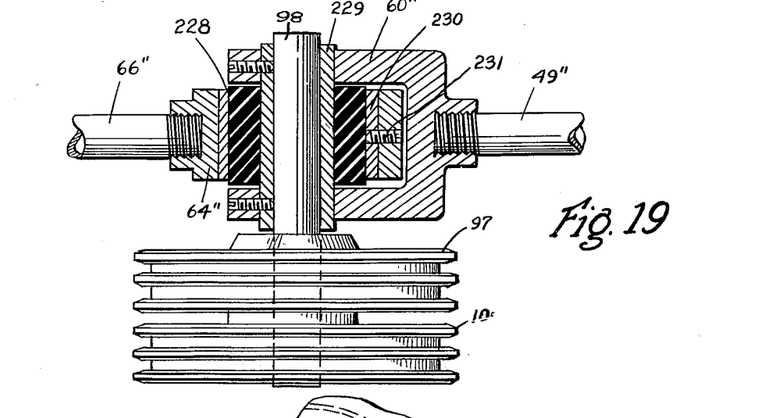
Fig. 19 is an enlarged fragmentary section along the line 19—19 of Fig. 18.
Figure 20:
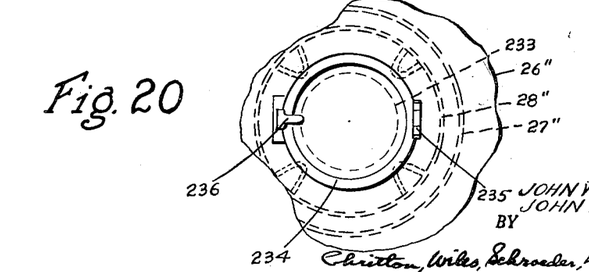
Fig. 20 is a fragmentary vertical view looking at the other end of the machine of Fig. 18.

A third embodiment of the invention is illustrated in Figs. 18, 19 and 20 (wherein the parts which are the same as in Figs. 1 to 14 are correspondingly numbered and parts which are analogous but of different construction are sometimes indicated by the corresponding numerals with a double prime added). This form is similar to that of Figs. 15 and 16 in that the rotating cylinder 28" has a single journal 31" at one end thereof and is supported by means of a horizontal arm 49", a downwardly inclined arm 66" and resilient connecting devices, one intermediate the arms 49" and 66" and the other intermediate the arm 66" and the frame 25". An exemplary form of these resilient connecting devices is shown in Fig. 19 in the form of a resilient bushing 228 of rubber or other suitable material. The interior surface of this bushing is bonded or vulcanized to a metal sleeve 229 which is rigidly secured to the end member 60" of the arm 49", as by welding. The outer surface of the bushing 228 is similarly bonded to a metal sleeve 230, which is secured to the end member 64" of the arm 66" by means including a set screw 231. The arms 49" and 66" are initially assembled with the resilient bushing 228 therebetween in the angular position shown in Fig. 18 so as normally to support the cylinder 28" concentrically in the shell 27". A similar resilient connecting device is provided between the pivot pin of bracket 58" (which may have its upper portion similar in form to the bifurcated member 60") and the lower end member of the arm 66" and said arm and bracket are initially assembled with the resilient bushing therebetween in the angular position shown in Fig. 18. Thus, the resilient bushings normally sustain the weight of the loaded cylinder 28" and permit orbital movement of the cylinder about its center of gravity when operating at high speed with an unbalanced load. A snubber 85" is provided intermediate the left hand end member 48" of the arm 49" and the arm 66" and functions to prevent or reduce excessive movement therebetween.

The drive for the cylinder 28" in this form of the invention is similar to that for the other forms and consists of pulleys and belts numbered the same as in Figs. 1 to 16. A motor 90" is connected to a speed change mechanism 190" by means of a belt 232, this speed change mechanism being provided with a solenoid 211" for shifting the speed change mechanism from high speed drive to low speed drive.

In this form of the invention, the end of the cylinder 28" opposite to the journal 31" is provided with a central opening 233 as shown in Fig. 20 and the shell 27" is shown with a door 234 which controls an access opening for inserting and removing materials from the cylinder 28". The door has a hinge 235 at one side and a locking device 236 at the other. This form of the invention is herein provided with the automatic control of Fig. 22, the same as the form illustrated in Figs. 15 and 16 so that the operation is similar to that already described for said previous form.

Figure 3A:
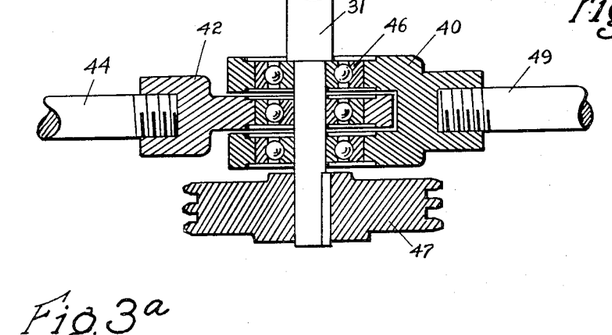
Fig. 3a is an enlarged fragmentary section along the line 3a—3a of Fig. 3.

As illustrated herein, it is intended that the connection between the cylinder journal 32 and the horizontal arms 45 and 50 (in the form illustrated in Figs. 1 to 14) will be substantially the same as shown in Fig. 3a and the pivotal connections between the horizontal arms and the downwardly extending arms will be of the type illustrated in detail in Fig. 14, with the exception of the connection between arms 49 and 66, which is illustrated in detail in Fig. 13. In all of these connections, the end members of the arms are provided with bushings and the arms are secured to the cross tubes by means of collars 240 and set screws 241.

The resilient connecting devices are preferably of the form shown in Fig. 11, although it is contemplated that connections of the type illustrated in detail in Fig. 19, as well as others, might be used. These resilient connecting devices are designed normally to support the cylinder for rotation about its geometric axis and to restrain movement of the cylinder away from said axis, but more important, these connections are so designed as to permit the cylinder to rotate with its axis moving freely in an orbit such as 81 of Fig. 12 when the load in the cylinder is unbalanced. The horizontal supporting arms function to permit the cylinder to oscillate in vertical planes about the pivots provided by the cross tubes 51 and 62 and the upright arms permit the cylinder to oscillate in substantially horizontal planes because of the pivotal connections of the upright arms to the brackets 58. It is a combination of the movements of the cylinder permitted by the horizontal and upright arms which results in the free orbital movement of the cylinder axis when the cylinder rotates at an extracting speed with an unbalanced load.

During acceleration of the cylinder and deceleration thereof with an unbalanced load therein, it passes through harmonic points at which the vibration or movement of the cylinder in its orbital path tends to become exaggerated beyond the amount encountered at full operating speed. This excessive movement of the cylinder, if not dampened or snubbed, would necessitate greater clearances between the cylinder and the shell and much heavier and longer support arms, resilient mountings, and other modifications. It is to eliminate such excessive movement of the cylinder that the snubbers 82 and 85 are provided. Preferably these snubbers perform no function at the tumbling speed of the cylinder or at the extracting speed, but do function during acceleration and deceleration in the event movement of the cylinder tends to become excessive. To avoid operation of the snubbers at normal operating speeds, they are preferably connected to the arms and base by resilient connecting devices, as illustrated in detail in Figs. 4a and 4b, these resilient connections being so designed as to yield through distances sufficient to accommodate the normal range of the connecting devices 68. Any movement of the arms beyond that for which the resilient connecting devices are designed causes operation of the snubbers and enables them to dampen such overtravel movements.

In an experimental machine of the type illustrated in Figs. 1 to 14, a cylinder was used which was 30 inches in diameter, 24 inches long, and weighed 285 pounds. When rotated at 1,000 R. P. M. with a five pound weight attached to the inner periphery of the cylinder, the centers of the journals moved in an orbit ¼ of an inch in diameter. With a 20 pound weight attached to the inner periphery of the cylinder, the centers of the journals moved in an orbit ¾ of an inch in diameter. With the resilient connecting devices 68 between the horizontal and upright arms located as shown in Fig. 3, the horizontal arm 44 has a length three times the distance from the cross tube 51 to the pivot on bracket 70, so that with a deflection of the cylinder axis of ¾ of an inch, the resilient device 68 would be deflected ¼ inch. If the lower connecting device 68 is attached to the arm 56 by the bracket 69 at a point one-third the distance up from the bracket 58, the deflection of said lower connecting device would, in turn, be approximately ¼ of an inch.

From this it can be seen that to accommodate an out-of-balance load equal to the equivalent of 20 pounds of concentrated weight on one side of the cylinder, the upper resilient connecting devices 68 should be capable of flexing ¼ inch in normal operation and the lower connecting devices should be capable of flexing ¼ of an inch in the example just described. However, such a 20 pound weight deflects the cylinder and the supporting means therefor by an amount substantially greater when the cylinder is accelerating to high speed and again when the cylinder is decelerating from high speed due to harmonic vibrations as hereinbefore described. When this overtravel of the cylinder and supporting means occurs, the pistons in snubbers 82 and 85 function as two-way dashpots to dampen or snub the overtravel.

It is preferable to construct the resilient connecting devices 68 and also those at the ends of the snubbers in such a manner as to accommodate the maximum out-of-balance load to be reasonably expected so that these connecting devices will function within their limits when such loads are encountered and without causing operation of the snubbers, the snubbers being primarily intended only for operation at intermediate speeds during acceleration and deceleration of the cylinder.

In the form illustrated in Figs. 18 to 20, the leverage of the horizontal arm 66' on the resilient bushing 228 is even greater than in the previous forms because the resilient member is located around the sleeve 229. Thus, the movement of the resilient bushing 228 is substantially less than that of the resilient connecting devices in the machines illustrated in Figs. 1 to 17.

It is believed readily apparent that in each of the forms herein disclosed, the invention provides a supporting means for a rotating cylinder which permits the cylinder to move with its axis travelling in an orbit about the center of gravity of the cylinder and load when the load is unbalanced. Since such orbital movement of the cylinder is permitted by the resilient supporting means, substantially no vibration will be transmitted to the frame of the machine. Generally it has been found that the longer the supporting arms are made, the more satisfactory will be the operation at high speed. Although we have herein disclosed a prime mover supported on the frame and connected to drive the cylinder through pulleys and belts in part supported on the arms, it will be readily apparent to those skilled in the art that other drives may readily be provided, even to the extent of supporting a suitable motor on the horizontal supporting arms and concentric with the cylinder journals. In certain types and sizes of machines, such a structure may be preferable in that it adds weight to the gyrating parts.

The invention is well adapted for use either in connection with the washing of clothes or dry cleaning and certain features thereof could readily be used in machines arranged solely for extracting. In the use of a combination washing and extracting machine, the detergent is generally discharged from the sump into a sewer, although at times it is desirable to pass the hot detergent through a heat exchanger before discharging it into a sewer so as to conserve some of the heat. When used for dry cleaning purposes, the detergent is usually passed through a filtration unit or a distillation unit, or both, and then reused.

We claim:

1. In a combined cleaning and extracting apparatus, in combination, a frame, a shell thereon, a rotatable horizontally disposed cylinder in said shell and having journals extending from the opposite ends thereof, a pair of arms extending horizontally in opposite directions from each of said journals and carrying bearings therefor on their adjacent ends, pairs of members pivotally connected to and extending in converging manner downwardly from the other ends of said arms to spaced apart pivot supports on said frame, resilient devices connecting said arms to said members and said members to said frame and cooperating with said arms, members and frame to support said cylinder for rotation about its center of gravity when containing an unbalanced load substantially without transmitting vibration to said frame.

2. In a washing machine, a stationary frame, a stationary detergent container attached to said frame, a rotatable container rotatably mounted on its horizontal axis in said detergent container, means for mounting said rotatable container comprising a generally horizontal support member having said rotatable container journaled therein at one end, a second support member, said second support member being pivotally connected at one end to said first support member and pivotally connected at the other end to said frame, a resilient connection between said first support member and said second support member and permitting limited pivotal movement therebetween, a second resilient connection between said second support member and said frame permitting limited pivotal movement therebetween, said resilient connections permitting said support members to pivot so that said rotatable container moves freely within the limits of the elasticity of the resilient connection around any dynamically required orbit during rotation thereof, and a snubbing device connected between said members.

3. A machine as defined in claim 2, wherein said resilient devices comprise a rubber bushing between, and having its inner and outer surfaces bonded to, the pivotally connected ends of said members, and a rubber bushing between, and having its inner and outer surfaces bonded to, said second member and said frame.

4. In a combined cleaning and extracting apparatus, in combination, a frame, a rotatable cylinder having journals extending from the opposite ends thereof, a pair of arms extending radially in opposite directions from each of said journals, bearings for said journals, said bearings being mounted in adjacent ends of said arms, pairs of members pivotally connected to and extending in converging manner from the other ends of said arms to spaced apart pivot supports on said frame, resilient devices connecting said arms to said members and said members to said frame and cooperating with said arms, members and frame to support said cylinder for rotation at an extracting speed when containing an unbalanced load, a prime mover, means connecting the prime mover to rotate the cylinder at a low speed for cleaning materials therein and alternatively at an extracting speed for discharging cleaning liquid therefrom, and a shell within which said cylinder is rotatably mounted about a horizontal axis passing through the cylinder ends, each of said pair of arms extending substantially horizontally.

5. In a washing machine, a stationary frame, a stationary detergent container attached to said frame, a rotatable container rotatably mounted on its horizontal axis in said detergent container, means for mounting said rotatable container comprising a pair of generally horizontal support members positioned at opposite ends of said container and having said rotatable container journaled therein at one end of each support member, a second pair of support members, each of said second support members being pivotally connected at one end to the other end of a different one of the first support members and pivotally connected at its other end to said frame, a resilient connection between each first support member and the second support member connected thereto, with said resilient connection permitting limited pivotal movement therebetween, a second resilient connection between each of the second support members and the frame for permitting limited pivotal movement therebetween, said resilient connections permitting said support members to pivot so that said rotatable container moves freely within the limits of the elasticity of the resilient connection around any dynamically required orbit during rotation thereof, and a snubbing device connected between said members.

6. In a washing machine, a stationary frame, a stationary detergent container attached to said frame, a rotatable container rotatably mounted on its horizontal axis in said detergent container, means for mounting said rotatable container comprising a pair of support members positioned at opposite ends of said container and having said rotatable container journaled therein at one end of each support member, a second pair of support members, each of said second support members being pivotally connected at one end to the other end of a different one of the first support members and pivotally connected at its other end to said frame, with at least one of said pairs of support members being generally horizontally arranged, a resilient connection between each first support member and the second support member connected thereto, with said resilient connection permitting limited pivotal movement therebetween, a second resilient connection between each of the second support members and the frame for permitting limited pivotal movement therebetween, said resilient connections permitting said support members to pivot so that said rotatable container moves freely within the limits of the elasticity of the resilient connection around any dynamically required orbit during rotation thereof, and a snubbing device connected between said members.

7. In a washing machine, a stationary frame, a stationary detergent container attached to said frame, a rotatable container rotatably mounted on its horizontal axis in said detergent container, means for mounting said rotatable container comprising a pair of support members positioned at opposite ends of said container and having said rotatable container journaled therein at one end of each support member, a second pair of support members, each of said second support members being pivotally connected at one end to the other end of a different one of the first support members and pivotally connected at its other end to said frame, a resilient connection between each first support member and the second support member connected thereto, with said resilient connection permitting limited pivotal movement therebetween, a second resilient connection between each of the second support members and the frame for permitting limited pivotal movement therebetween, said resilient connections permitting said support members to pivot so that said rotatable container moves freely within the limits of the elasticity of the resilient connection around any dynamically required orbit during rotation thereof, and a snubbing device connected between said members.

JOHN W. CHAMBERLIN.
JOHN F. HORVATH.

REFERENCES CITED

The following references are of record in the file of this patent:

UNITED STATES PATENTS

| Number | Name | Date |
| --- | --- | --- |
| 1,089,748 | Clark | Mar. 10, 1914 |
| 2,130,160 | Schellenberg | Sept. 13, 1938 |
| 2,175,936 | Zimarik | Oct. 10, 1939 |
| 2,217,351 | Soderquist | Oct. 8, 1940 |
| 2,230,345 | Bradbury | Feb. 4, 1941 |
| 2,255,908 | Anderson | Sept. 16, 1941 |
| 2,267,785 | Chamberlin | Dec. 30, 1941 |
| 2,296,264 | Breckenridge | Sept. 22, 1942 |
| 2,312,905 | Zimarik | Mar. 2, 1943 |
| 2,318,806 | Sisson | May 11, 1943 |
| 2,343,742 | Breckenridge | Mar. 7, 1944 |
| 2,352,362 | Bassett | June 27, 1944 |
| 2,356,818 | Bruckman | Aug. 29, 1944 |
| 2,431,040 | Harvey | Nov. 18, 1947 |